United States Patent [19]

Kao et al.

[11] Patent Number: 5,008,933
[45] Date of Patent: Apr. 16, 1991

[54] AUTOMATIC STERILIZING DEVICE OF THE TELEPHONE

[76] Inventors: Chun-Hsien Kao, 4F., No. 11, Lane 223, Cheng-Kung Rd., Sec. 4, Nei-Hu Chu, Taipei; Fu-Te Chen, 2F., No. 9, Hsi-Chang Rd., Taipei, both of Taiwan

[21] Appl. No.: 245,315

[22] Filed: Sep. 16, 1988

[51] Int. Cl.$^5$ ............................................. H04R 1/12
[52] U.S. Cl. ..................................... 379/452; 379/439
[58] Field of Search ................ 379/451, 452, 437, 439

[56] References Cited

U.S. PATENT DOCUMENTS

| | | | |
|---|---|---|---|
| 2,495,034 | 1/1950 | Sullivan | 379/452 |
| 2,697,173 | 12/1954 | Balakofsky | 379/452 |
| 2,911,488 | 11/1959 | Quintas | 379/452 |
| 2,952,749 | 9/1960 | Cobb et al. | 379/439 |
| 3,040,138 | 6/1962 | Cobb | 379/439 |
| 3,049,597 | 8/1962 | Koop | 379/439 |
| 3,967,927 | 7/1976 | Patterson | 422/49 |
| 4,613,928 | 9/1986 | Weinert | 379/452 |
| 4,736,416 | 4/1988 | Weinert | 379/439 |

FOREIGN PATENT DOCUMENTS

| | | | |
|---|---|---|---|
| 3321760 | 12/1984 | Fed. Rep. of Germany | 379/452 |
| 44-19885 | 8/1969 | Japan | 379/452 |
| 1129189 | 10/1968 | United Kingdom | 379/452 |

*Primary Examiner*—James L. Dwyer
*Attorney, Agent, or Firm*—Browdy and Neimark

[57] ABSTRACT

An automatic sterilizing device for a telephone comprises a microswitch which is controlled by a telephone cut-off press button, an IC control circuit turning off automatically the ultraviolet electric bulb power at a time, an ultraviolet electric bulb radiating the ultraviolet rays, and a safety switch controlled by the receiver of the telephone. The microswitch, bulb and IC control circuit are united in the receiver seat and the mouthpiece seat in the housing of the telephone. After using the telephone, the receiver is placed on its seat and contacts the microswitch, and then the power is provided to make the ultraviolet bulb produce ultraviolet rays to radiate the mouthpiece to sterilize the mouthpiece. In the meantime, a signal is produced to contact the delay circuit of the IC control circuit at the time of contact of the microswitch. After the set delay time, the IC control circuit automatically turns off the power of the ultraviolet bulb.

1 Claim, 2 Drawing Sheets

A-A SECTION

5,008,933

AUTOMATIC STERILIZING DEVICE OF THE TELEPHONE

FIELD OF THE INVENTION

The present invention is related to an automatic sterilizing device of the telephone. In particular, the present invention can automatically and completely sterilize the mouthpiece every time after the telephone is used. The public health, of course, can be kept.

BACKGROUND OF THE INVENTION

The installation and use of the telephone is very common nowadays, and the telephone is really convenient and practical. The mouthpiece of the telephone, however, when placed at the relative position while being used, is usually polluted by the user's saliva. For the reason that viruses carried therein can multiply easily for a long time, the mouthpiece can produce a damp smell or other bad smell and make others nauseated. Especially, it is easy to infect other disorders and very dangerous if the telephone is used by a man who has pulmonary disorders. Therefore, the telephones of some offices are fixedly provided with a sterilizing piece outside of every mouthpiece for preventing the multiplication of viruses. The sterilizing piece is really sanitary and it is not easy to smell the dampness of the telephone. Besides, owing to the function of fragrance compounds therein, the user can smell a slight fragrance. The sterilizing piece is really progressional. Sterilizing piece, however, can only be kept a short time limit, changing of the sterilizing piece is required at least every two weeks. Although there are some firms which provide the service of changing the sterilizing piece for the companies in the business district of a city and the firms always charge a relatively cheap service charge, there are some places which do not have such benefits. The house of the residential area located far from urban areas has only a telephone or two, and the aforesaid service benefit may not be available to such a house. That is always the problem for the household.

OBJECT OF THE INVENTION

The object of the present invention is to solve the aforesaid problem, and provides a kind of automatically sterilizing device for the telephone which can sterilize automatically the mouthpiece of the telephone every time after it is used. The present invention sterilizes completely and is highly reliable. Besides, the present invention can avoid the problem of changing the sterilizing piece on time and does not have the problem where someone forgets change the sterilizing piece.

SUMMARY OF THE INVENTION

An automatic sterilizing device of the telephone is composed of a microswitch, an IC control circuit, an ultraviolet bulb and a safety switch. The present invention is united in the receiver seat and mouthpiece seat in the housing of the telephone. After using the telephone, the receiver is placed on its seat and contacts the microswitch, and then power is provided to make the ultraviolet bulb produce ultraviolet rays to radiate the mouthpiece and to sterilize it. In the meantime, a signal is produced to contact the delay circuit of the IC control circuit at the time of contact with the microswitch. After a set delay time, the IC control circuit automatically makes the power of the ultraviolet bulb become the open circuit to turn off the power. The present invention can sterilize automatically the mouthpiece every time after using the telephone.

SPECIFIC DESCRIPTION

Figure 1:
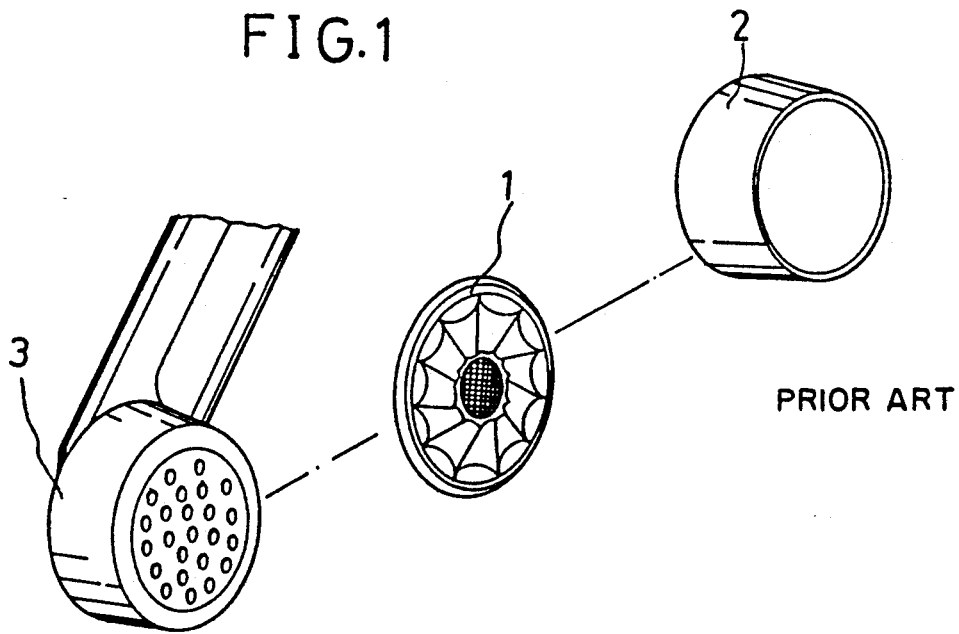
FIG. 1 is a exploded view of the sterilizing piece installed conventionally on the mouthpiece outside of the telephone.

Referring to FIG. 1, the conventional sterilizing piece 1 is covered on the mouthpiece 3 by a cover 2. The sterilizing piece 1, which forms a circular-netted piece to adapt to the shape of the mouthpiece 3, is connected with a cotton paper that is soaked with a small amount of sterilizing liquid and fragrance compound for preventing the multiplication of viruses.

Figure 2:
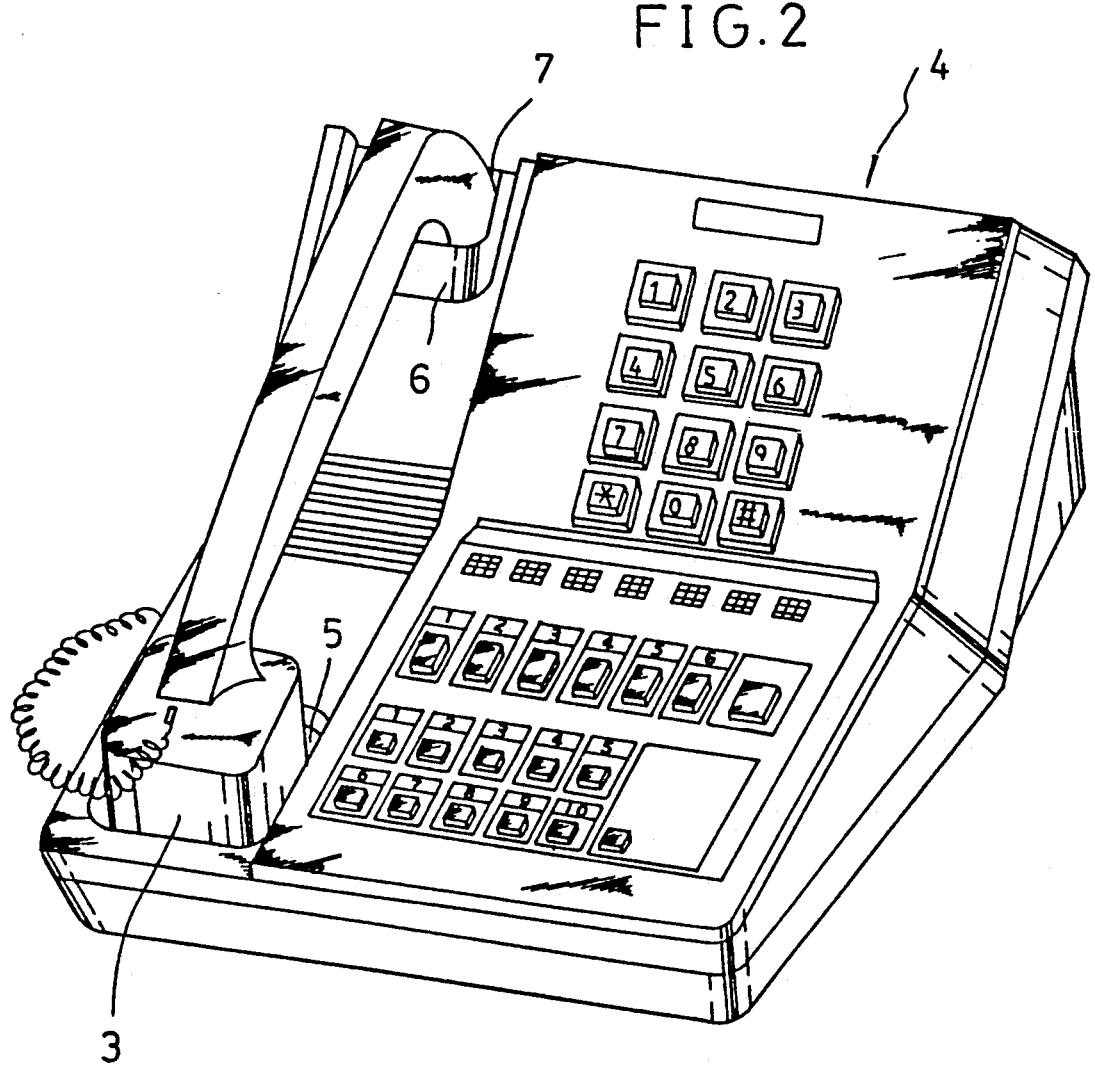
FIG. 2 is a static conditional view for the structure of the present invention.

As shown in FIG. 2, the appearance of the telephone which is installed with the present invention is characterized with the mouthpiece seat 5 containing the mouthpiece 3 and the receiver seat 7 containing the receiver 6 in the same way as of the conventional telephone.

Figure 3:
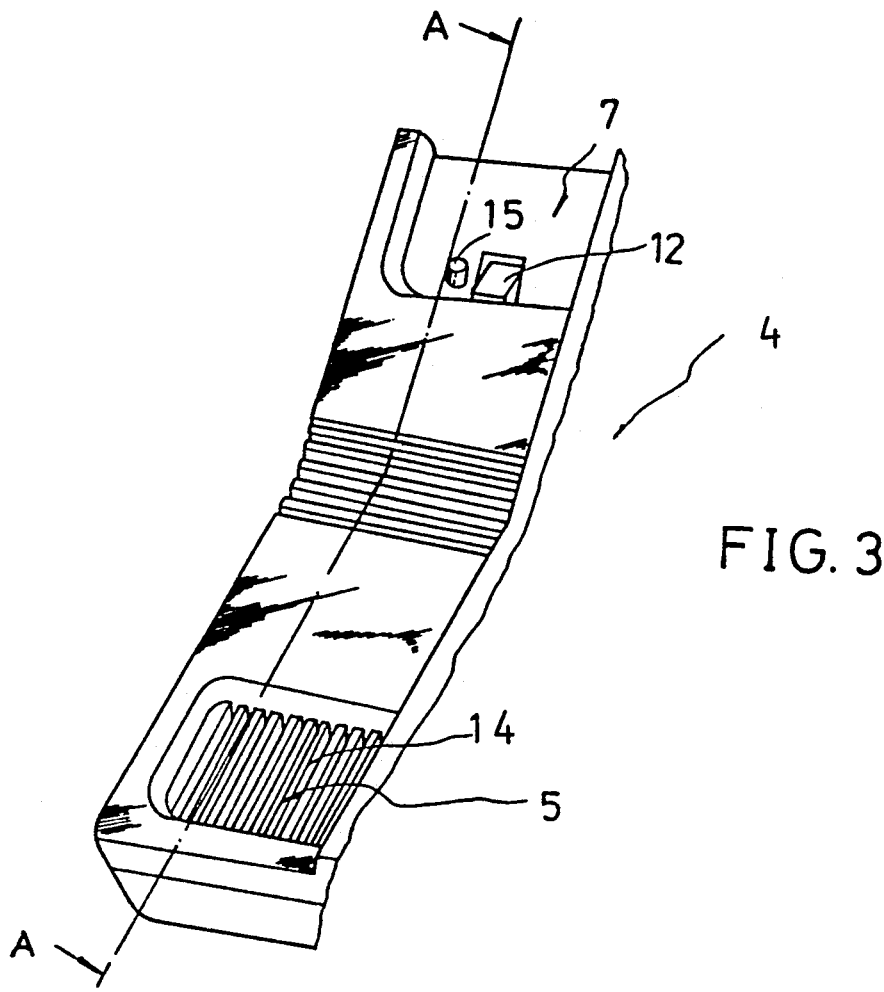
FIG. 3 shows a view of the receiver seat and mouthpiece seat when the receiver and mouthpiece are removed.
Figure 4:
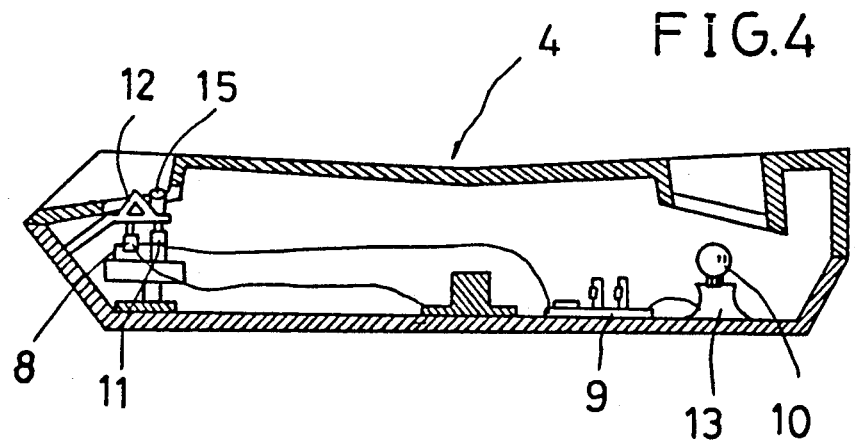
FIG. 4 is a cross-sectional view taken along line A—A in FIG. 3.

Referring to FIGS. 3 and 4, the present invention is composed of a microswitch 8, an IC control circuit 9, an ultraviolet bulb 10 and a safety switch 11. The present invention is united under the receiver seat 7 and mouthpiece seat 5 in the housing of the telephone. The microswitch 8 is installed under the telephone cut off press button 12 in the receiver seat 7. When the receiver 6 is placed on the receiver seat 7, the telephone cut off press button 12 is pressed to cut off the line and contacts openly the microswitch 8 to provide power to ultraviolet bulb 10 at the time of contact. Besides, a signal is generated to contact the delay circuit of the IC control circuit 9. After a set delay time, the IC control circuit 9 automatically makes the ultraviolet bulb 10 part of an open circuit to turn off power to the bulb. The sterilizing operation of the mouthpiece is then finished, and the device waits for the next use of the telephone. The aforesaid ultraviolet bulb 10 is installed on the bulb seat 13 under the mouthpiece seat 5. The ultraviolet rays pass through the openings 14 installed on the mouthpiece seat 5 and radiate directly the mouthpiece 3 to sterilize it. The safety witch 11 is also a microswitch, and is provided under the receiver seat 7. The contact button 15 of the safety switch 11 extends into the receiver seat 7 from a small hole provided on the receiver seat 7. Owing to the pressure of the receiver 6 when it is placed into the receiver seat 7, the contact button 15 of the safety switch 11 is pressed down to make the circuit to be free to operate. When the telephone is being sterilized and a man needs to use the telephone, he has only to take up the receiver 6 and the mouthpiece 3. That is, the contact button 15 is released and causes the circuit of the ultraviolet bulb 10 open and thus stop sterilization.

The method of the present telephone is as same as of the conventional telephone. After using the telephone, it is required only to place the receiver 6 and the mouthpiece 3 into the receiver seat 7 and the mouthpiece seat 5. The mouthpiece seat 5 can radiate automatically the ultraviolet rays and sterilize the mouthpiece 3, and stop automatically after the set time.

We claim:

1. An automatic sterilizing device for a telephone having a mouthpiece and a receiver, said device comprising:

an ultraviolet bulb provided on a bulb seat under a mouthpiece seat for producing ultraviolet rays to pass through openings defined in the mouthpiece seat and radiate directly on the mouthpiece;

a microswitch disposed under a telephone cut-off press button which extends out from a receiver seat, said microswitch adapted to be contacted by a downward movement of the telephone cut-off press button to generate a signal when contacted by the press button;

an IC control circuit comprising a time delay circuit responsive to said signal for sending power to said ultraviolet bulb and for cutting off power to said ultraviolet bulb after a predetermined delay time from receipt of said signal by said delay circuit has occurred;

a contact button extending out from the receiver seat adapted to be depressed by insertion of the receiver into the receiver seat; and a safety switch installed under the receiver seat adapted to be contacted by depression of said contact button to turn off said ultraviolet bulb when said contact button is not depressed.

* * * * *